(12) United States Patent
Geltner et al.

(10) Patent No.: US 9,167,374 B2
(45) Date of Patent: Oct. 20, 2015

(54) MACHINE-TO-MACHINE RULES MANAGEMENT METHODS AND SYSTEMS

(71) Applicant: Verizon Patent and Licensing Inc., Arlington, VA (US)

(72) Inventors: David Geltner, Naperville, IL (US); Mohanraj Umapathy, San Marcos, CA (US); Ryan Kennedy, Chicago, IL (US); Hon Man Hammond Hui, Chicago, IL (US); Yonghong Yang, Chula Vista, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 257 days.

(21) Appl. No.: 13/680,511

(22) Filed: Nov. 19, 2012

(65) Prior Publication Data

US 2014/0143395 A1  May 22, 2014

(51) Int. Cl.
*H04W 4/00* (2009.01)
*H04L 12/24* (2006.01)

(52) U.S. Cl.
CPC ........... *H04W 4/005* (2013.01); *H04L 41/0893* (2013.01); *H04L 41/22* (2013.01)

(58) Field of Classification Search
CPC ................................. G06F 15/16; H04L 12/24
USPC ......................................................... 709/223
See application file for complete search history.

(56) References Cited

U.S. PATENT DOCUMENTS 8,737,989 B2 * 5/2014 Luft ........................... 455/432.3
2012/0089727 A1 * 4/2012 Raleigh et al. ................. 709/224
2013/0262576 A1 * 10/2013 Foti ............................... 709/204

* cited by examiner

*Primary Examiner* — Vivek Srivastava
*Assistant Examiner* — Sibte Bukhari

(57) ABSTRACT

An exemplary method includes a machine-to-machine ("M2M") rules management system associated with an M2M platform 1) processing a plurality of events associated with one or more M2M objects in substantially real-time as the events occur over a period of time, 2) receiving, while the events are being processed in substantially real-time, data representative of a rule created by a user associated with the M2M platform, and 3) dynamically applying, in response to receiving the data representative of the rule, the rule to the substantially real-time processing of the events. Corresponding methods and systems are also disclosed.

18 Claims, 12 Drawing Sheets

Manage M2M

Switch User • Log Out
Account: Customer1 • Timezone: GMT +6:30

| Dashboard | Device List | Device Reports | Admin | Logs | Support |

Switch Account | Contact Setup | Rule Setup | Notification Group Setup | Dashboard Config | Account Setup | Device Group | Device Setup | Organization Setup

Rule Setup ❓

Account: * ⟵ 802
[Customer1 ▼]

[Submit] [Reset]

Rule Details

Rule Name: * ⟵ 804
[Rule123]

Status: *
☑ Enabled

Notification Group: * ⟵ 806
[Customer Group 1 ▼] [+]

Device ID ⟵ 808
[Device_1234 ▼]

☐ Aggregate

Event Type: * ⟵ 810
[Provisioning of device ▼]

Conditions: *
[-- ▼] [         ] [-- Please Select -- ▼]  ⟵ 812

○ Notify on Request
● Notify on Confirmation  ⟵ 814
○ Notify on Failure

[Save] [Cancel]

Manage M2M

Switch User • Log Out
Account: Customer1 • Timezone: GMT +6:30

| Dashboard | Device List | Device Reports | Admin | Logs | Support |

Switch Account | Contact Setup | Rule Setup | Notification Group Setup | Dashboard Config | Account Setup | Device Group | Device Setup | Organization Setup

Rule Setup ❓

Account: * ─902
[Customer1 ▼]

[Submit] [Reset]

Rule Details

Rule Name: * ─904
[Rule456]

Status: *
☑ Enabled

Notification Group: * ─906
[Customer Group 1 ▼] [+]

Device ID: * ─908
[Device_1234 ▼]

☐ Aggregate

Event Type: * ─910
[Usage in KB ▼]

Conditions: *
[> ▼] [1000] KB [MONTHLY ▼]
            912

[Save] [Cancel]

Fig. 9

MACHINE-TO-MACHINE RULES MANAGEMENT METHODS AND SYSTEMS

BACKGROUND INFORMATION

Machine-to-machine ("M2M") technology is a growing industry designed to communicatively connect machines to one another. An M2M solutions provider uses M2M technology to provide an M2M solution to a customer. For example, an M2M solutions provider may provide a client such as a trucking company with an M2M solution that communicatively connects the trucking company's fleet of trucks to a company computing system (e.g., a personal or server computer operated by the trucking company). Company personnel may utilize the company computing system to monitor and/or control the fleet of trucks by way of the M2M solution.

An M2M solutions provider may provide an M2M solution over an M2M platform. Accordingly, the M2M solution may be said to be built on the M2M platform, with the M2M platform providing foundational functionality to support the M2M solution. For example, the M2M platform may provide underlying functionality that establishes communication paths and routes communications between a customer computing system and in-field customer assets as part of an M2M solution.

An M2M solutions provider may provide custom M2M solutions to a variety of customers in diverse industries. The delivery and management of diverse custom M2M solutions can be challenging for the M2M solutions provider. For example, each customer may want its particular M2M solution to monitor different types of events that occur within the framework of the M2M solution and take different types of actions based on the occurrence of the events. Providing this capability has heretofore required a significant amount of effort, coordination, and time from the point of view of the M2M solutions provider. Moreover, each time a customer desires to add or modify a rule that governs how one or more events are processed, the customer has heretofore had to wait for the M2M solutions provider to process, provision, and ultimately implement the rule.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 8-9 show exemplary graphical user interfaces ("GUIs") that may be presented to a user according to principles disclosed herein.

DETAILED DESCRIPTION OF PREFERRED EMBODIMENTS

Machine-to-machine ("M2M") rules management methods and systems are described herein. As will be described below, an M2M rules management system associated with an M2M platform may 1) process a plurality of events associated with one or more M2M objects in substantially real time as the events occur over a period of time, 2) receive, while the events are being processed in substantially real time, data representative of a rule created by a user associated with the M2M platform, and 3) dynamically apply the rule to the substantially real-time processing of the events in response to receiving the data representative of the rule.

As used herein, an "M2M object" refers to any device utilizing the M2M platform (e.g., a customer asset, a customer computing device, a server or other computing device associated with the M2M solutions provider) or any entity utilizing the M2M platform (e.g., a customer of the M2M solutions provider or the M2M solutions provider itself). An "event" associated with an M2M object refers to any action taken by the M2M object and/or any change in one or more properties and/or characteristics of the M2M object. For example, an event may refer to a change in data usage by a computing device utilizing the M2M platform, a change in an operating temperature of a furnace or other utilities device, a sending of a particular type of message by a computing device utilizing the M2M platform, etc. An event may additionally or alternatively be associated with a group of M2M objects and may refer to any action taken by the group of M2M objects and/or any change in one or more properties and/or characteristics of the group of M2M objects. The group of M2M objects may be customer defined or grouped automatically based on one or more object properties. In some examples, an event may refer to any non-action taken by the M2M object. For example, an event may refer to a lack of data transmitted by the M2M object during a predetermined time period, a failure to perform one or more scheduled actions, and/or any other non-action as may serve a particular implementation.

The methods and systems described herein may facilitate more effective and efficient creation and/or modification of customized M2M solutions for one or more customers of an M2M solutions provider compared to conventional M2M solution schemes. For example, the methods and systems described herein may allow a customer to create and immediately deploy one or more customized rules without having to wait for the M2M solutions provider to process, provision, and ultimately implement the one or more customized rules. Moreover, by processing events in substantially real time as the events occur, the methods and systems described herein may allow a customer to be immediately notified of the occurrence of such events and/or perform certain actions (e.g., remedial actions) in response to the occurrence of the events.

Figure 1:
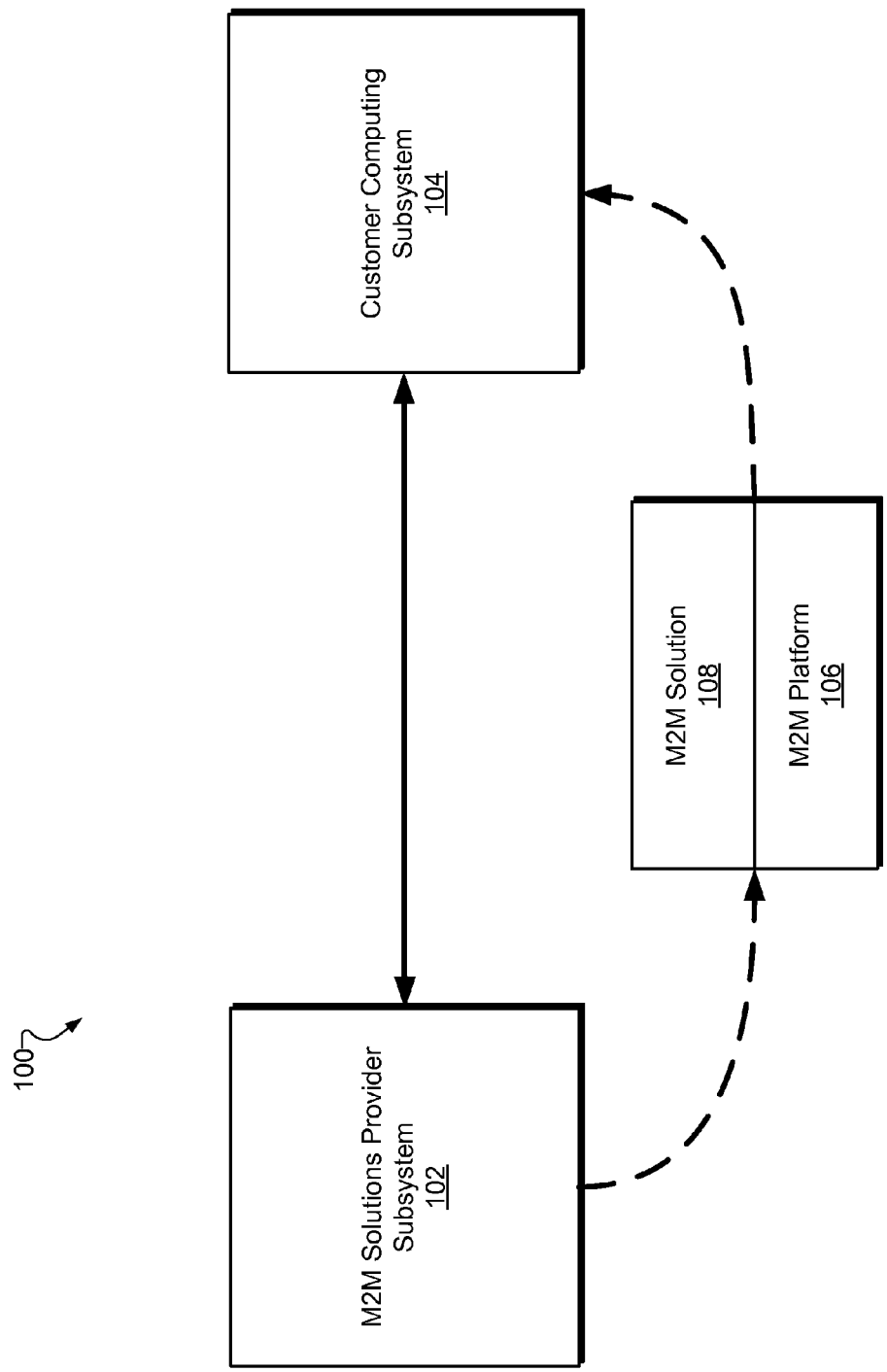
FIG. 1 illustrates an exemplary M2M system according to principles disclosed herein.

FIG. 1 illustrates an exemplary M2M system 100. As shown, system 100 may include an M2M solutions provider subsystem 102 and a customer computing subsystem 104 in communication with one another. As illustrated by the dashed lines in FIG. 1 and as will be described in more detail below, M2M solutions provider subsystem 102 may provide an M2M platform 106 upon which an M2M solution 108 may be built for a customer associated with customer computing system 104. The customer may accordingly utilize M2M solution 108 and underlying M2M platform 106 in order to facilitate M2M communications between various computing devices and/or other customer assets (e.g., in-field customer assets) implementing and/or in communication with customer computing subsystem 104.

M2M solutions provider subsystem 102 may be associated with (e.g., owned by, operated by, and/or managed by) an M2M solutions provider. For example, M2M solutions provider subsystem 102 may be associated with one or more entities involved in providing an M2M solution to a customer. To illustrate, M2M solutions provider subsystem 102 may be associated with a first entity that provides M2M platform 106 and a second entity that provides M2M solution 108, a single entity that provides both M2M platform 106 and M2M solution 108, and/or any other entity or combination of entities involved in providing M2M platform 106 and M2M solution 108 as may serve a particular implementation.

Customer computing subsystem 104 may be associated with (e.g., owned by, operated by, and/or managed by) a customer of the M2M solutions provider. For example, the customer may include an entity (e.g., a business, person, etc.) that has various computing devices, machines, sensors, data centers, and/or other assets that communicate one with another by way of M2M platform 106 and M2M solution 108 provided by M2M solutions provider subsystem 102.

In some examples, M2M solution 108 may comprise an abstraction of one or more high-level, customer-visible services ("customer services") provided by the M2M solutions provider as part of the M2M solution 108. Customer services may include solution-level services provided by M2M solutions provider subsystem 102 as part of M2M solution 108. For example, these customer services may include, without limitation, adding customer assets to M2M solution 108 (by connecting the customer assets to M2M platform 106), monitoring and reporting a status and/or performance of the customer assets, providing means for controlling the customer assets, facilitating customer creation and/or management of applications associated with M2M solution 108, etc.

M2M platform 106 may comprise an abstraction of one or more lower-level services ("platform services") that support and/or perform the customer services of M2M solution 108. Platform services may include platform-level services provided by M2M solutions provider subsystem 102 as part of M2M platform 106 and that may support, underlie, and/or perform one or more customer services of M2M solution 108 provided on top of M2M platform. For example, platform services may include, without limitation, configuring sensors of customer assets, counting data usage of customer assets, translating communications for various telecommunications carriers, etc.

Examples of M2M solution 108, customer services, M2M platform 106, and platform services are described in more detail herein.

M2M solutions provider subsystem 102 and customer computing subsystem 104 may each include and/or be implemented by one or more appropriately configured computing devices, such as one or more server devices located at one or more data centers, one or more client devices configured to communicate with the server devices, customer assets, and/or any other appropriately configured computing devices. The computing devices may be configured to use M2M technology to communicate one with another. As mentioned, M2M solution 108 and/or M2M platform 106 may facilitate M2M communications between various customer assets (e.g., field devices, communication devices, machines, sensors, computing devices, servers, data centers, etc.) that implement and/or are otherwise associated with customer computing subsystem 104.

Figure 2:
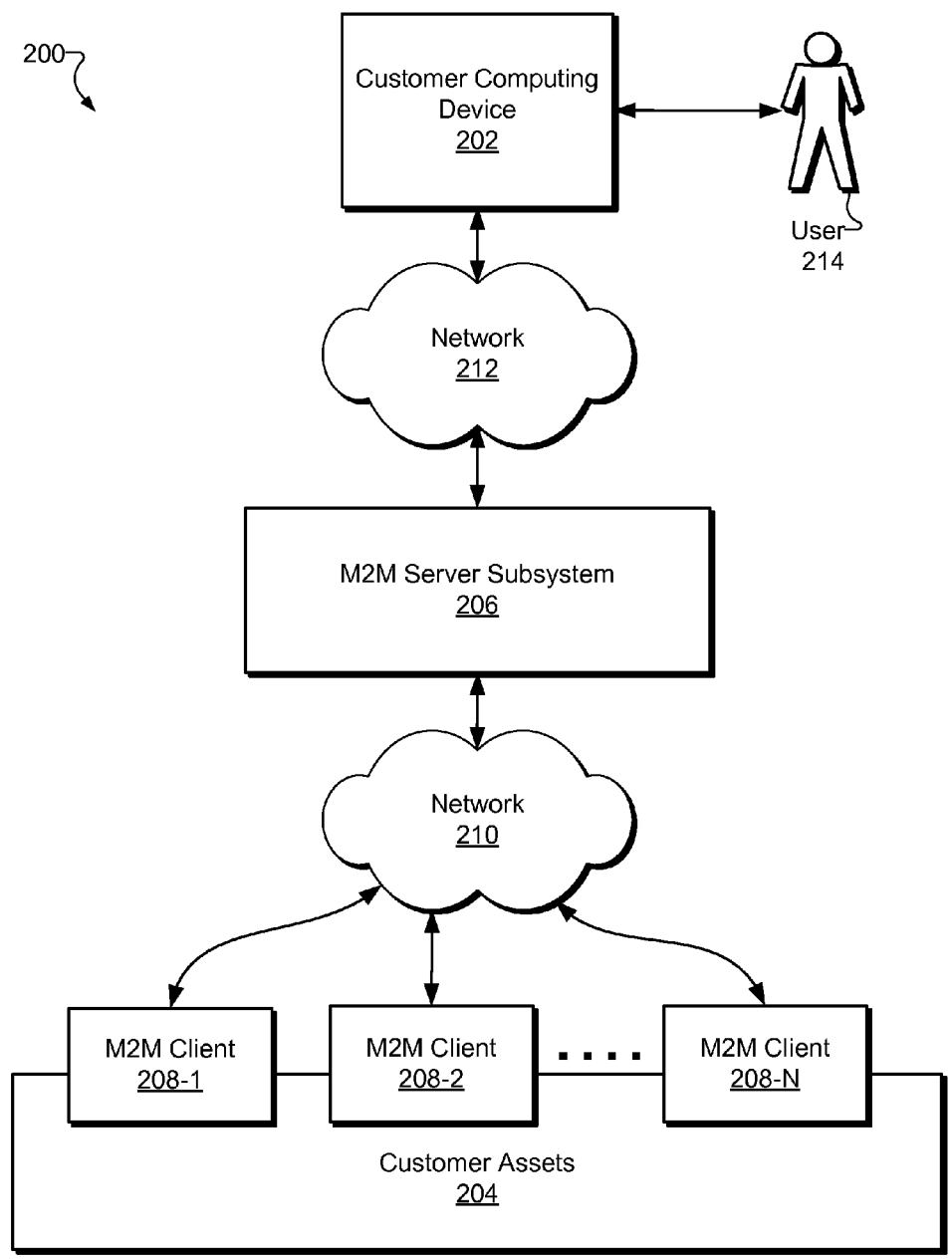
FIG. 2 illustrates an exemplary implementation of the system of FIG. 1 according to principles disclosed herein.

FIG. 2 illustrates an exemplary implementation 200 of M2M system 100. As shown, implementation 200 may include a customer computing device 202, a plurality of customer assets 204, an M2M server subsystem 206, and a plurality of M2M clients 208 (e.g., M2M clients 208-1 through 208-N). In some examples, customer computing device 202 and customer assets 204 may implement customer computing subsystem 104, and M2M server subsystem 206 and M2M clients 208 may implement M2M solutions provider subsystem 102. Each of these components will now be described in more detail.

Customer computing device 202 may include any suitable computing device (e.g., server, personal computer, mobile computing device, etc.) associated with a customer of an M2M solutions provider and configured to communicate with customer assets 204 by way of an M2M solution and platform (e.g., M2M solution 108 and M2M platform 106). Customer computing device 202 may be configured to execute one or more applications configured to interact with the M2M solution. The applications may be developed by the M2M solutions provider, the customer, a system integrator commissioned by the M2M solutions provider and/or the customer, a third party, or any combination thereof.

Customer assets 204 may include any devices, machines, apparatuses, computing devices, sensors, and/or other assets associated with the customer of the M2M solutions provider. In certain examples, customer computing device 202 may include a server located in a data center associated with the customer, and customer assets 204 may include remotely deployed field devices (e.g., parking meters, vending machines, digital billboards, electric meters, etc.). Other configurations and locations of customer computing device 202 and customer assets 204 may be employed in other examples in accordance with the methods and systems described herein as may serve a particular implementation.

M2M server subsystem 206 may be implemented by one or more servers associated with (e.g., managed or otherwise operated by) an M2M solutions provider. The one or more servers may be located in a single data center, distributed across a plurality of data centers (e.g., disparately located data centers), and/or otherwise configured as may serve a particular implementation. M2M server subsystem 206 may be configured to execute or otherwise provide one or more platform services of an M2M platform such as M2M platform 106. Exemplary platform services that may be provided by M2M server subsystem 206 are described in more detail herein.

M2M clients 208 may be configured to provide an M2M communication interface for customer assets 204. M2M clients 208 may provide an M2M communication interface for customer assets 204 in any suitable way. As an example, an M2M client (e.g., M2M client 208-1) may include communication hardware (e.g., a cellular modem) configured to facilitate communication between one or more customer assets 204 and M2M server subsystem 206 by way of a network 210. To illustrate, M2M client 208-1 may be configured to function as a communication gateway or hub for one or more customer assets 204, which may be communicatively coupled to M2M client 208-1 in any suitable manner (e.g., by way of a wired and/or wireless connection).

As another example, one or more of M2M clients 208 may be implemented by a software client that may be loaded or installed onto one or more customer assets 204. For example, an M2M software client may be installed onto a particular customer asset 204 before or after the customer asset 204 has been deployed and may facilitate M2M communications between the customer asset 204 and M2M server subsystem 206.

As another example, an M2M client 208 may be implemented by a stand-alone device configured to be communicatively coupled to a particular customer asset 204. For example, a particular customer asset 204 (e.g., a vending machine) may be retrofitted with an M2M client device (e.g., a sensor device that includes a cellular modem) in order to facilitate M2M communications between the customer asset 204 and M2M server subsystem 206. Additionally or alternatively, an M2M client 208 may be integrated into a particular customer asset 204 at the time of manufacture.

As another example, an M2M client 208 may be implemented by one or more sensors configured to monitor an operation of one or more customer assets 204. For example, an M2M client 208 may capture or detect one or more events that occur with respect to a particular customer asset 204. As used herein, an "event" that may occur with respect to a customer asset may include a change in one or more properties and/or characteristics of the customer asset. Examples of such an event may include, but are not limited to, a change in data usage by the customer asset, a change in an inventory level of the customer asset, and/or a change in power usage by the customer asset.

As mentioned, M2M clients 208 may communicate with M2M server subsystem 206 by way of network 210. Likewise, M2M server subsystem 206 may be configured to communicate with customer computing device 202 by way of network 212. Networks 210 and 212 may each include one or more wireless networks, cellular networks (e.g., 3G, 4G, or long term evolution ("LTE") networks), carrier-specific networks, broadband networks, closed media networks, cable networks, satellite networks, the Internet, intranets, wide area networks, local area networks, public networks, private networks, optical fiber networks, and/or any other networks or combination of networks capable of carrying data and communications signals between customer computing device 202 and M2M server subsystem 206 and/or between M2M server subsystem 206 and M2M clients 208. While networks 210 and 212 are shown to be separate networks in FIG. 2 (e.g., network 210 may include one or more telecommunication carrier networks and network 212 may include the Internet), it will be recognized that, in some examples, networks 210 and 212 may alternatively be a single network.

Customer computing device 202, M2M server subsystem 206, and M2M clients 208 may communicate using any communication technologies suitable for transporting data, including known communication devices, media, and protocols supportive of remote or local data communications. Examples of such communication technologies include, but are not limited to, data transmission media, communications devices (e.g., network devices such as routers, switches, etc.), Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Ethernet, and any other suitable communications technologies, devices, media, and protocols, including any of those disclosed herein.

In certain implementations, M2M communications, such as M2M communications between customer computing device 202, M2M server subsystem 206, and M2M clients 208 may use command and acknowledgement processing. For example, for each M2M message received, an acknowledgement message is returned. If a predefined acknowledgement time limit expires before an acknowledgement message is received by a sender of an M2M message, the sender resends the M2M message or stores and resends the M2M message at a future time. In certain implementations, acknowledgement messages may contain return codes, which may be used to verify the validity of the messages. The use of command and acknowledgement processing for M2M messaging may produce a communications infrastructure that is suitable for a reliable M2M platform and M2M solutions built on the M2M platform.

In some examples, one or more users may be associated with customer computing device 202 and/or M2M server subsystem 206. For example, as shown in FIG. 2, a user 214 may be associated with customer computing device 202. User 214 may be a customer, a system administrator, an M2M solution integrator (e.g., a person commissioned by the customer and/or the M2M solutions provider to work with the customer to set up and/or manage an M2M solution), and/or any other person associated with customer computing device 202.

User 214 may utilize customer computing device 202 to communicate with and/or control one or more customer assets 204 by way of an M2M solution. To this end, user 214 may utilize customer computing device 202 to configure, create, modify, or otherwise access one or more rules, features, and/or other custom settings associated with an M2M solution (e.g., M2M solution 108) provided or otherwise managed by M2M server subsystem 206. For example, user 214 may utilize customer computing device 202 to access one or more management portals provided by M2M server subsystem 206 by way of which the user 214 may configure, create, modify, or otherwise access one or more rules, features, and/or other custom settings associated with the M2M solution provided by M2M server subsystem 206.

M2M server subsystem 206 may be configured to provide an M2M platform, such as M2M platform 106, and/or functionality of an M2M platform. As described herein, the M2M platform may provide communication paths and/or facilitate communications between customer computing device 202 and M2M clients 208 as part of an M2M solution. The M2M platform may include and/or provide additional functionality that supports the M2M solution (and one or more other M2M solutions built on the M2M platform). As mentioned, such platform functionality may be provided by platform services of the M2M platform.

Figure 3:
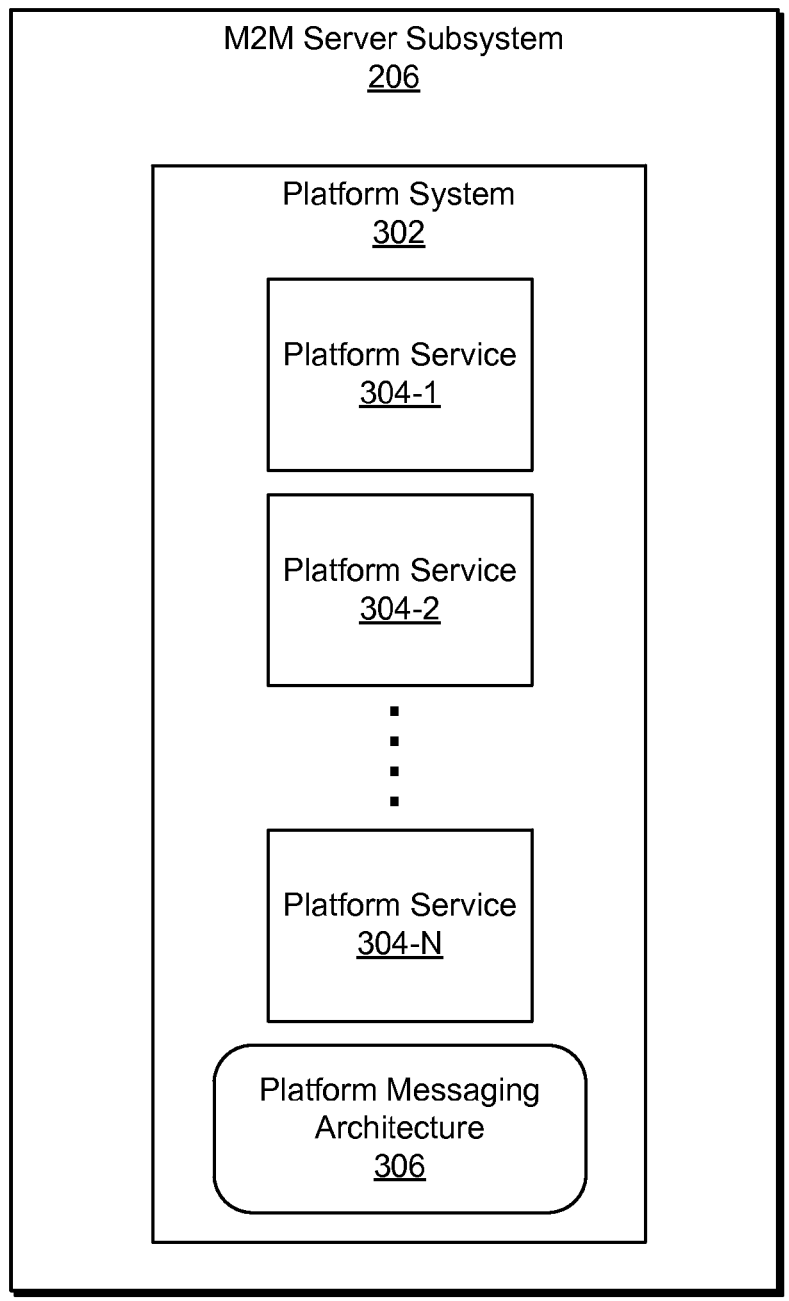
FIG. 3 illustrates exemplary components of an M2M server subsystem according to principles disclosed herein.

To illustrate, FIG. 3 shows exemplary components of M2M server subsystem 206. As shown, M2M server subsystem 206 may include a platform system 302 that comprises a set of platform services 304 (e.g., platform services 304-1 through 304-N) and a platform messaging architecture 306.

Platform services 304 may be configured to provide functionality of an M2M platform provided by platform system 302. In certain examples, each platform service within the set of platform services 304 may be configured to provide a particular set of M2M platform functions. Platform services 304 may be implemented in any suitable way. For example, a platform service 304 may be implemented as an application (e.g., a software, firmware, and/or middleware application), such as a web application, Linux application, and/or any other suitable application running on one or more server devices at one or more data centers operated by an M2M platform provider. Examples of platform services 304 will now be described.

The set of platform services 304 may include one or more platform services configured to provide functionality for external communications. For example, platform services 304 may include one or more M2M client gateway services configured to provide functionality for communications between M2M server subsystem 206 and M2M clients 208. Examples of such services may include, without limitation, a Dynamic Secure Network ("DSN") gateway service, a Simple Network Management Protocol ("SNMP") gateway service, a Multifunction Telecommunications Addressing System ("MTAS") gateway service, a Really Simple Syndication ("RSS") gateway service, a Short Message Service ("SMS") gateway service, and a carrier-specific Global Data Service Platform ("GDSP") gateway service.

In certain examples, the set of platform services 304 may include specific M2M client gateway services for respective communications technologies and/or carriers. For example, the set of platform services 304 may include a gateway service for a first telecommunications carrier and another gateway service for a second telecommunications carrier. Additionally or alternatively, the set of platform services 304 may include a gateway service for a first communications technology (e.g., DSN communications) and another gateway service for a second communications technology (e.g., SNMP communications). While specific communications technologies that may be supported by the set of platform services 304 for communications with M2M clients 208 are disclosed herein, the examples are illustrative only. The set of platform services 304 may be configured to support any communications technologies that may be used for communications with M2M clients 208.

Platform services 304 may additionally or alternatively include one or more customer interface services configured to provide functionality for communications between M2M server subsystem 206 and customer computing device 202. For example, platform services 304 may include one or more customer interface platform services configured to provide functionality for communications between M2M server subsystem 206 and customer computing device 202. Examples of such services may include, without limitation, a web services platform service (e.g., Unified Web Services ("UWS") service), a customer portal platform service, a rules engine platform service, and a notification platform service.

A web services platform service may be configured to interface with and/or facilitate functionality on customer computing device 202, such as by facilitating the execution of an application on customer computing device 202, such that the application running on customer computing device 202 may connect and interact with the web services platform service by way of network 212. The web services platform service may further facilitate integration of one or more customer services associated with an M2M solution within customer computing device 202.

The customer portal platform service may be configured to provide functionality to interface with customer computing device 202, such as with a web browser application running on customer computing device 202, by way of network 212. For example, customer portal platform may provide data for use by customer computing device 202 to render a graphical user interface of a web portal such that a user of customer computing device 202 may interact with web portal by way of the graphical user interface.

The rules engine platform service may be configured to manage (e.g., maintain and/or execute) one or more rules that specify how events detected by M2M clients 208 are to be processed by other platform services included in platform system 302.

The notification platform service may be configured to provide functionality to provide notifications (e.g., a notification that data usage by a customer asset has reached a predetermined data usage threshold) to user 214 by way of customer computing device 202 (or to any other user by any other computing device) by way of network 212.

The customer interface platform services, such as those described above, may provide customer facing interfaces through which a customer may interact with an M2M solution provided by system 100.

In certain examples, platform services 304 may include a common carrier platform service configured to provide functionality that creates a level of abstraction between technology-specific and/or carrier-specific platform services and one or more other platform services (e.g., customer interface services) included in the set of platform services 304. To this end, the common carrier platform service may be configured to provide functionality for translating messages to and/or from formats that are suitable for technology-specific and/or carrier-specific platform services. To illustrate, a web services platform service within platform system 302 may receive a control message provided by customer computing device 202 in a web services message format (e.g., Simple Object Access Protocol ("SOAP"), Extensible Markup Language ("XML"), or Web Service Description Language ("WSDL")) to M2M server subsystem 206 by way of network 212 and route the control message to a common carrier platform service within platform system 302. The common carrier platform service may translate the control message from the web services message format to another format that is specific to a carrier gateway platform service configured to transmit the control message to an appropriate M2M client 208. The common carrier platform service may then route the translated control message to the carrier gateway platform service, which may process and transmit the control message to the M2M client 208 by way of network 210.

The level of abstraction provided by the common carrier platform service may help produce an environment friendly to customers and/or developers by simplifying the development of custom M2M solutions. For example, a customer-facing interface may employ a single communications interface that allows applications to be developed to interact with the single communications interface. The common carrier platform service may perform translations that allow various carriers and/or technologies to be used within M2M system 100, without requiring a customer to account for or even be aware of which carriers and/or technologies are being used to provide an M2M solution to the customer. In certain examples, specific technologies and/or carriers used by M2M system 100, and particularly by platform system 302, may be transparent to the customer.

In certain examples, the level of abstraction provided by the common carrier platform service may allow a user (e.g., a customer of an M2M solutions provider) to conveniently provision (i.e., activate) and de-provision (i.e., deactivate) devices on a carrier network. The common carrier platform service may hide specifics (e.g., complexities) of a carrier network and processes, which may simplify the provisioning and de-provisioning operations for the user.

Figure 4:
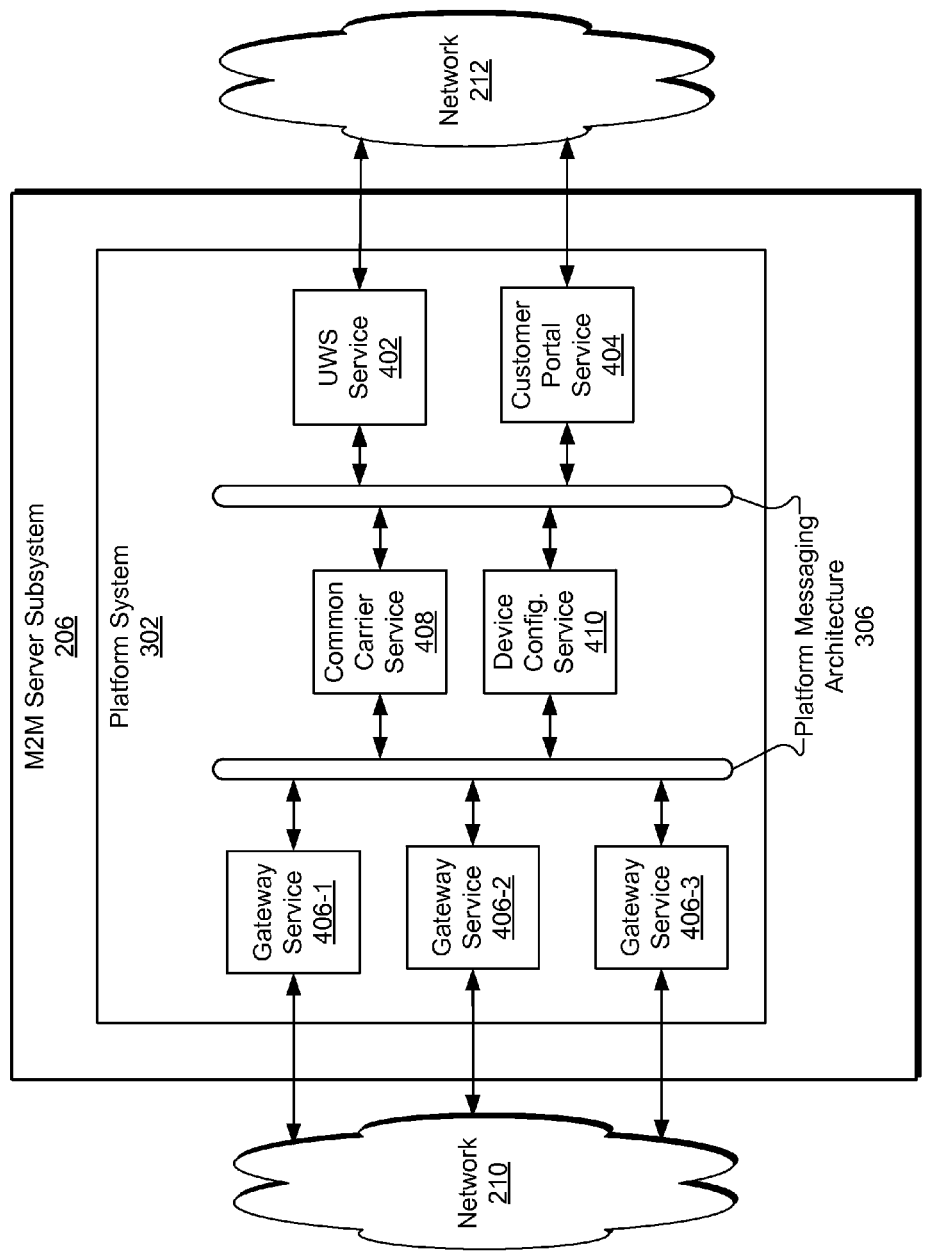
FIG. 4 illustrates exemplary platform services that may be included in a platform system according to principles disclosed herein.

FIG. 4 illustrates exemplary platform services that may be included in platform system 302. As shown, platform system 302 may include a UWS service 402 and a customer portal service 404 communicatively coupled to network 212. UWS service 402 and customer portal service 404 may be configured to communicate with customer computing device 202 by way of network 212.

Platform system 302 may further include gateway services 406 (e.g., gateway services 406-1 through 406-3) communicatively coupled to network 210. Gateway services 406 may be configured to communicate with M2M clients 208 by way of network 210. In certain examples, each of the gateway services 406 may be specific to a particular telecommunications carrier and/or communications technology (e.g., SNMP, RSS, MTAS, SMS, or other suitable network transport and/or protocol technology).

Platform system 302 may further include a common carrier service 408 configured to translate data (e.g., communication messages) between different formats, protocols, etc. and/or to provide a level of abstraction between gateway services 406 and one or more other platform services included in platform system 302.

Platform system 302 may further include a device configuration service 410 configured to communicate with M2M clients 208 by way of gateway services 406 and network 210 to facilitate configuration of the M2M clients 208 to communicate with platform system 302 using particular data communication technologies included in the data communication technologies supported by platform system 302. To illustrate, platform system 302 may support various data communication technologies that may be used for communications with M2M clients 208, such as various data communication transports, protocols, and/or services (e.g., SMS, wireless, wireline, TCP, UDP, etc.). Device configuration service 410 may communicate with an M2M client 208 to facilitate configuration of the M2M client 208 to use a particular data communication transport, protocol, and/or service to communicated with platform system 302. For instance, device configuration service 410 may communicate with the M2M client 208 to facilitate configuration of the M2M client 208 to use SMS to communicate with platform system 302.

In certain examples, the exemplary platform services and the interconnections thereof (e.g., by way of platform messaging architecture 306) illustrated in FIG. 4 may represent one or more pathways along which data (e.g., M2M application data, sensor data, etc.) may flow between customer computing device 202 and M2M clients 208 within an M2M platform provided by platform system 302. For example, customer computing device 202 may send a message to UWS service 402 by way of network 212. UWS service 402 may process the message such as by receiving and routing the message to common carrier service 408. Common carrier service 408 may receive and process the message such as by translating the message from a web services message format to a gateway-specific format and routing the translated message to a gateway service 406. The gateway service 406 may then receive and process the message such as by transmitting the message to an M2M client 208 by way of network 210. As another example, an M2M client 208 may send a message to a gateway service 406, which may receive and route the message to common carrier service 408. Common carrier service 408 may receive, translate (e.g., from a gateway-specific format to a web services message format), and route the message to UWS service 402. UWS service 402 may then receive and process the message such as by transmitting the message to customer computing device 202 by way of network 212.

The exemplary platform services described above, such as the platform services illustrated in FIG. 4, are illustrative only. Additional or alternative platform services may be included in platform system 302. For example, referring again to FIG. 3, the set of platform services 304 may include, without limitation, a discovery platform service that may be configured to discover and/or to maintain and provide configuration data (e.g., configuration software) to an M2M client 208, a sensor configuration platform service that may be configured to maintain and provide sensor configuration data to an M2M client 208, a sensor data delivery platform service that may be configured to receive data (e.g., readings, events, errors, etc.) from an M2M client 208, a device control platform service that may be configured to receive control input from customer computing device 202 (e.g., directly or by way of one or more other platform services 304 such as customer portal service 404) and to provide device control commands to an M2M client 208 (e.g., directly or by way of one or more other platform services 304 such as a gateway service 406), an SMS platform service that may be configured to abstract an SMS interface to various telecommunications carriers such that the SMS interface may be used for SMS communications without having to deal with specifics of multiple carrier networks, an application server platform service for enterprise applications (e.g., for Java enterprise applications), a terminal wakeup platform service that may be configured to "awake" a field device (e.g., to call in and report) such as by connecting to the device using a TCP/IP connection or sending an SMS communication to the device (e.g., by way of the SMS platform service), an authentication and accounting platform service that may be configured to authenticate a field device to a carrier network, and a device performance platform service that may be configured to perform one or more operations associated with determining (e.g., monitoring) measures of device performance. Examples of other platform services are also described below.

Platform services 304 included in platform system 302 may be disparate and loosely coupled to one another in certain implementations. For example, platform services 304 may be implemented in a service-oriented architecture. In such implementations, each platform service 304 may be configured to provide a discrete set of functions of an M2M platform. Such a loosely coupled compartmentalization of platform functionality may be well suited for addressing challenges related to scale, availability, customizability, and performance of an M2M platform.

Platform services 304 may be configured to communicate with one another via well-defined interfaces (e.g., XML, JSON, etc.). For certain inter-service communications, the platform services 304 may communicate with one another by way of platform messaging architecture 306.

Platform messaging architecture 306 may comprise a message delivery architecture and/or layer configured to process messages within an M2M platform provided by platform system 302. For example, platform messaging architecture 306 may be configured to receive and deliver messages from/to platform services 304 to facilitate communications between the platform services 304.

Figure 5:
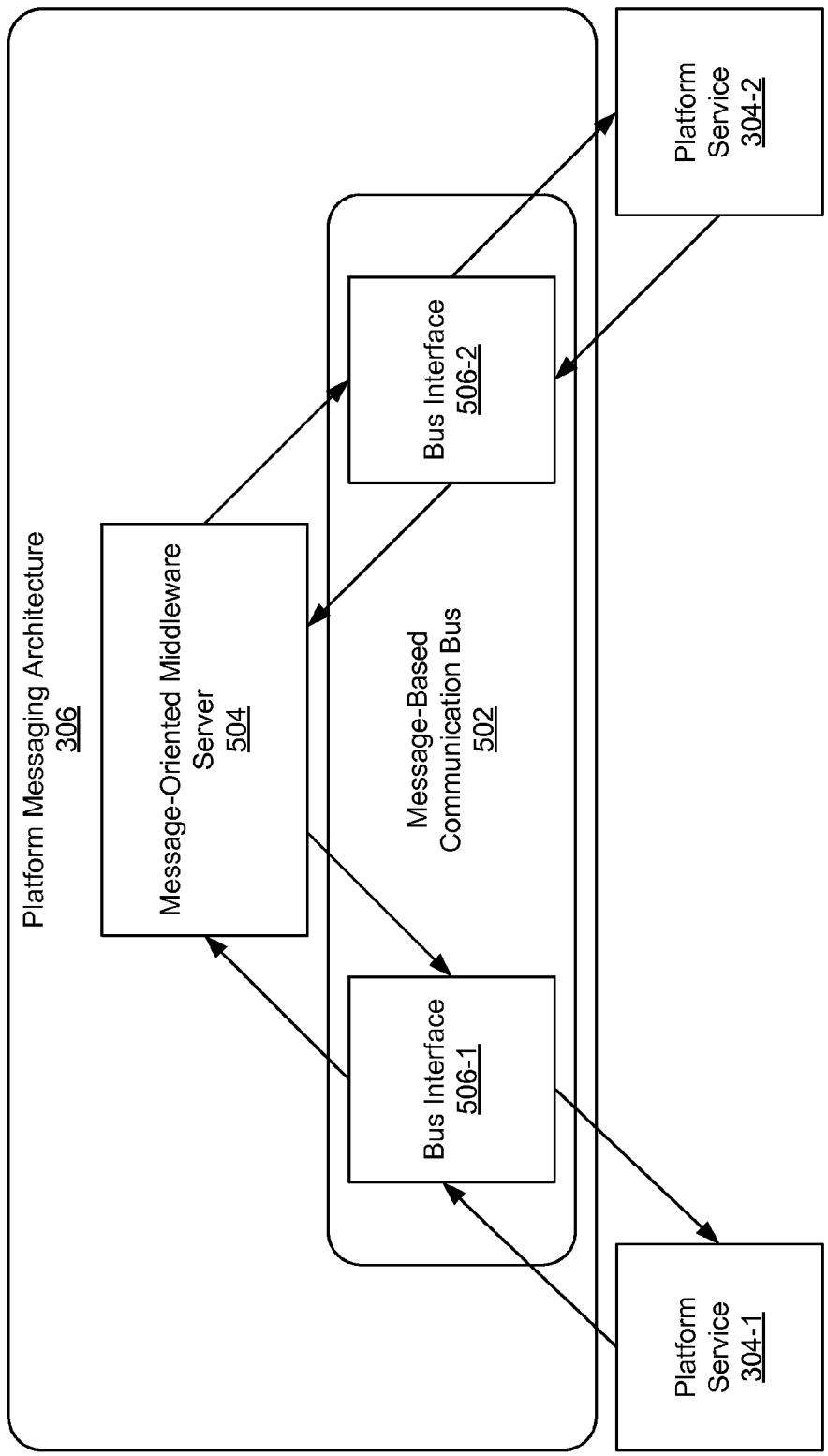
FIG. 5 illustrates an exemplary flow of communications between platform services by way of a platform messaging architecture according to principles disclosed herein.

Platform messaging architecture 306 may comprise any message delivery architecture suitable for an M2M platform. To illustrate, FIG. 5 shows components of an exemplary implementation of platform messaging architecture 306 and a flow of communications between platform services by way of platform messaging architecture 306. As shown, platform messaging architecture 306 may include a message-based communication bus 502 and a message-oriented middleware server 504, which may be in communication one with another.

Message-oriented middleware server 504 may include any message delivery infrastructure that supports sending and receiving of messages by way of a distributed communications layer. In certain implementations, message-oriented middleware server 504 may comprise a Java Message Service ("JMS") server which may be configured to communicate with message-based communications bus 502 via a low-level input/output application program interface ("API"), such as a JMS API. In some examples, the JMS server may comprise a commercial off-the-shelf product.

Message-oriented middleware server 504 may be configured to use a universal message protocol for transport and delivery of messages. In certain implementations, for example, message-oriented middleware server 504 may use SOAP messages on top of a JMS protocol for transport and delivery of messages.

Message-oriented middleware server 504 may be configured to maintain one or more messaging queues and to read, write, or otherwise facilitate the communication of messages to/from such messaging queues or other messaging queues. For example, a queue within message-oriented middleware server 504 may be allocated to or otherwise associated with each platform service included in a set of platform services 304. The queues may be labeled with identifiers for (e.g., names of) the associated platform services 304. Message-oriented middleware server 504 may be configured to read ("dequeue") messages from the queues and/or to write ("enqueue") messages to the queues. Message-oriented middleware server 504 may be further configured to route messages to queues. The routing may include routing a message across one or more data centers to an appropriate queue assigned to a specific platform service. To illustrate, message-oriented middleware server 504 may read a message from a queue associated with a first platform service and determine, from the message, a destination platform service and/or queue to which the message is to be routed. Message-oriented middleware server 504 may route and write the message to the queue associated with the destination platform message.

Message-based communications bus 502 may provide an interface between message-oriented middleware server 504 and one or more platform services 304 that are connected to message-based communications bus 502. Message-based communications bus 502 may be in communication with message-oriented middleware server 504 by way of one or more APIs (e.g., a standard JMS API) exposed by message-oriented middleware server 504. Through such APIs, message-based communications bus 502 may provide messages to and retrieve messages from message-oriented middleware server 504. For example, message-based communications bus 502 may be configured to provide a message (e.g., a SOAP message) to message-oriented middleware server 504 for routing and delivery to a destination and/or to retrieve a message from message-oriented middleware server 504 by way of an API exposed by message-oriented middleware server 504.

Message-based communications bus 502 may be in communication with platform services 304 in any suitable way. For example, a platform service may be connected to message-based communications bus 502 at a bus interface. In FIG. 5, for instance, platform service 304-1 is connected to message-based communications bus 502 at a bus interface 506-1 included in the message-based communications bus 502, and platform service 304-2 is connected to message-based communications bus 502 at another bus interface 506-2 included in the message-based communications bus 502.

A platform service may connect to a bus interface 506 of message-based communications bus 502 in any suitable way. In certain implementations, for example, a bus interface 506 may be configured to allow a platform service to connect to message-based communications bus 502 by way of a low-level communication layer (e.g., a transport-level layer of message-based communications bus 502). Such a connection may allow the platform service to utilize functionality of message-based communications bus 502 directly by way of detailed, transport-level function calls and/or other low-level communications. Such low-level communications may provide the platform service with flexibility in utilizing certain capabilities built into message-based communications bus 502. Such flexibility may be unavailable (e.g., abstracted away) through a higher level connection to message-based communications bus 502.

Additionally or alternatively, in certain implementations, a bus interface 506 may be configured to allow a platform service to connect to message-based communications bus 502 by way of a higher, abstraction-level communication layer that abstracts away detail of the low-level communications layer. To this end, the bus interface 506 may provide a higher-level interface layer with which a platform service may connect. The higher-level interface layer may be configured to translate higher-level communications into low-level function calls of the low-level communications layer and vice versa. Such an interface between a platform service and message-based communications bus 502 may provide less flexibility in comparison to the flexibility provided by a direct connection between a platform service and message-based communications bus 502 at a low-level transport layer but may provide convenience to a developer of the platform service because the platform service can communicate by way of the abstraction-level interface. platform messaging architecture 306 platform messaging architecture 306

In certain implementations, a bus interface 506 may comprise a message-based communication bus layer within a platform service. For example, bus interface 506-1 may comprise a message-based communication bus layer implemented within platform service 304-1. A platform service connected to a bus interface 506 of the message-based communications bus 502 may function as a destination point (e.g., a figurative "bus stop") along message-based communications bus 502.

A bus interface (e.g., bus interface 506-1 or 506-2) included in message-based communications bus 502 may be configured to translate messages between a messaging format and/or protocol specific to a platform service (e.g., platform service 304-1 or 304-2) connected to the bus interface and a universal messaging format and/or protocol used by message-oriented middleware server 504. This may provide a level of abstraction between platform services 304 and message-oriented middleware server 504. Accordingly, platform services may use heterogeneous messaging formats and/or protocols to communicate with one another by way of platform messaging architecture 306. The abstraction may prove helpful to a developer (e.g., an M2M platform provider) of platform services, as the abstraction may allow the developer to focus on the functionality of the platform services under development rather than the communication challenges the platform services will face when deployed.

To illustrate, platform service 304-1, which may be implemented with a Java programming language, may make a call to invoke platform service 304-2. In some examples, platform service 304-1 may not have access to information about platform service 304-2 beyond the name of the platform service 304-2. For example, platform service 304-1 (and each other platform service 304) may include and maintain a directory of platform services included in the set of platform services 304. In some examples, the directory may specify the platform services by name only.

In the present example, platform service 304-2 may use the name of platform service 304-2 (as specified in the directory of platform services) to issue a call to invoke platform service 304-2. Bus interface 506-1 may detect the call, determine that the call is directed to another platform service 304-2, translate the call from a Java message to a universal messaging protocol used by message-oriented middleware server 504 (e.g., a SOAP message), and provide a universal messaging protocol message to message-oriented middleware server 504 for delivery to platform service 304-2. Message-oriented middleware server 504 may route the message to a queue associated with platform service 304-2 and write the message to the queue. Bus interface 506-2 associated with platform service 304-2 may read the message from the queue, translate the message to a format and/or protocol specific to platform service 304-2 (e.g., to a C# format if platform service 304-2 is implemented with a C# programming language), and provide the translated message for processing by platform service 304-2.

In this or a similar manner, platform messaging architecture 306 may provide communication paths and flows between platform services 304 such that the platform services 304 may communicate with one another by way of the platform messaging architecture 306. The communication paths and flows may be secure and/or reliable. For example, message-oriented middleware server 504 may be configured to buffer, store, and/or asynchronously send messages in any suitable way. The message queues of message-oriented middleware server 504 described above may allow platform services to send and receive messages between one another asynchronously, which may allow a source platform service to send messages without regard for the availability and/or location of destination platform services or their readiness to receive messages. Additionally, the asynchronous messaging allows messages to be delivered even if a destination platform service fails to receive the message immediately. For example, a message may remain in a queue until a destination platform service is ready to read the message from the queue.

As mentioned, in certain implementations, message-based communications bus 502 may include bus interfaces 506 implemented as individualized messaging layers within respective platform services 304. In other examples, message-based communications bus 502 may be implemented as a discrete communication bus platform service. In such implementations, platform services 304 may be configured to communicate with the communication bus platform service and to rely on the communication bus platform service to route messages between the platform services 304. This decoupling of message-based communications bus 502 from platform services 304 may be referred to as "platformization" and may facilitate independent modification of (e.g., updates to) message-based communications bus 502 and/or platform services 304. In addition, platform system 302 may run multiple versions of message-based communications bus 502 within platform system 302. This may provide flexibility to platform services 304 to select which of the available message-based communications bus 502 versions to use.

In some examples, message-oriented middleware server 504 may be implemented as a discrete communication bus platform service. In implementations in which both message-based communications bus 502 and message-oriented middleware server 504 are implemented as platform services, message-based communications bus 502 and message-oriented middleware server 504 may be implemented by disparate platform services or integrated into a single platform service.

In addition to providing a communicative architecture to facilitate message transmission between platform services as described herein, platform messaging architecture 306 may also be configured to provide one or more other, non-communicative services as may serve a particular implementation. For example, in some implementations of platform system 302, all messages between platform services 304 may be communicated by way of platform messaging architecture 306. Such implementations may allow platform messaging architecture 306 to facilitate an audit on past and ongoing communications within platform system 302. Data obtained from such an audit may include status information and/or statistics characterizing communications between platform services and may thus be used as business intelligence to allow, for example, an M2M solutions provider to modify certain platform services 304 and/or platform system 302 to be more efficient. Additionally or alternatively, platform messaging architecture 306 may be configured to limit or otherwise control communications between platform services. For example, if an M2M solutions provider determines (e.g., via an audit of recent communications on platform messaging architecture 306) that a particular platform service is overusing platform messaging architecture 306 (e.g., "talking too much"), the M2M solutions provider may limit or otherwise arbitrate the number of messages the platform service is able to send for some amount of time. This limiting and/or arbitrating may be done in any suitable way and for any suitable amount of time. Platform messaging architecture 306 may further facilitate communicative and non-communicative functionality within platform system 302 in any manner that serves a particular implementation.

Figure 6:
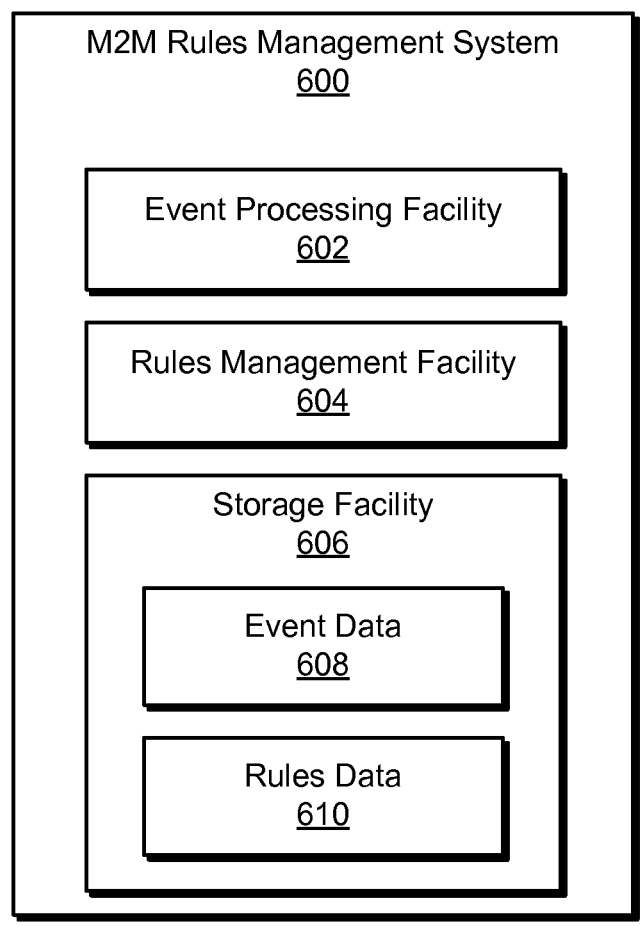
FIG. 6 illustrates an exemplary M2M rules management system according to principles disclosed herein.

FIG. 6 illustrates an exemplary M2M rules management system 600 ("system 600") that may be used to perform the various M2M rules management operations described herein. System 600 may be implemented by M2M solutions provider subsystem 102, M2M server subsystem 206, and/or M2M clients 208. For example, system 600 may be implemented by the rules engine platform service and/or notification platform service described above.

As shown, system 600 may include, without limitation, an event processing facility 602, a rules management facility 604, and a storage facility 606 selectively and communicatively coupled to one another. It will be recognized that although facilities 602-606 are shown to be separate facilities in FIG. 6, any of facilities 602-606 may be combined into fewer facilities, such as into a single facility, or divided into more facilities as may serve a particular implementation.

Event processing facility 602 may be configured to process a plurality of events associated with one or more M2M objects in substantially real time as the events occur over a period of time. As used herein, "substantially real-time" refers to "real-time" or "near real-time." In other words, event processing facility 602 processes an event at or right after a point in time at which the event occurs without waiting to batch process the event together with other events that occur after the event occurs.

Event processing facility 602 may process an event in any suitable manner. For example, event processing facility 602 may process an event associated with a particular customer asset by determining that the event has occurred (e.g., by receiving data representative of the event from an M2M client (e.g., one of M2M clients 208) associated with the particular customer asset) and then dynamically processing the event in accordance with a predefined rule. The predefined rule may direct event processing facility 602 to evaluate one or more conditions in response to the occurrence of the event and perform one or more actions based on the occurrence of the event if the one or more conditions are met.

Figure 7:
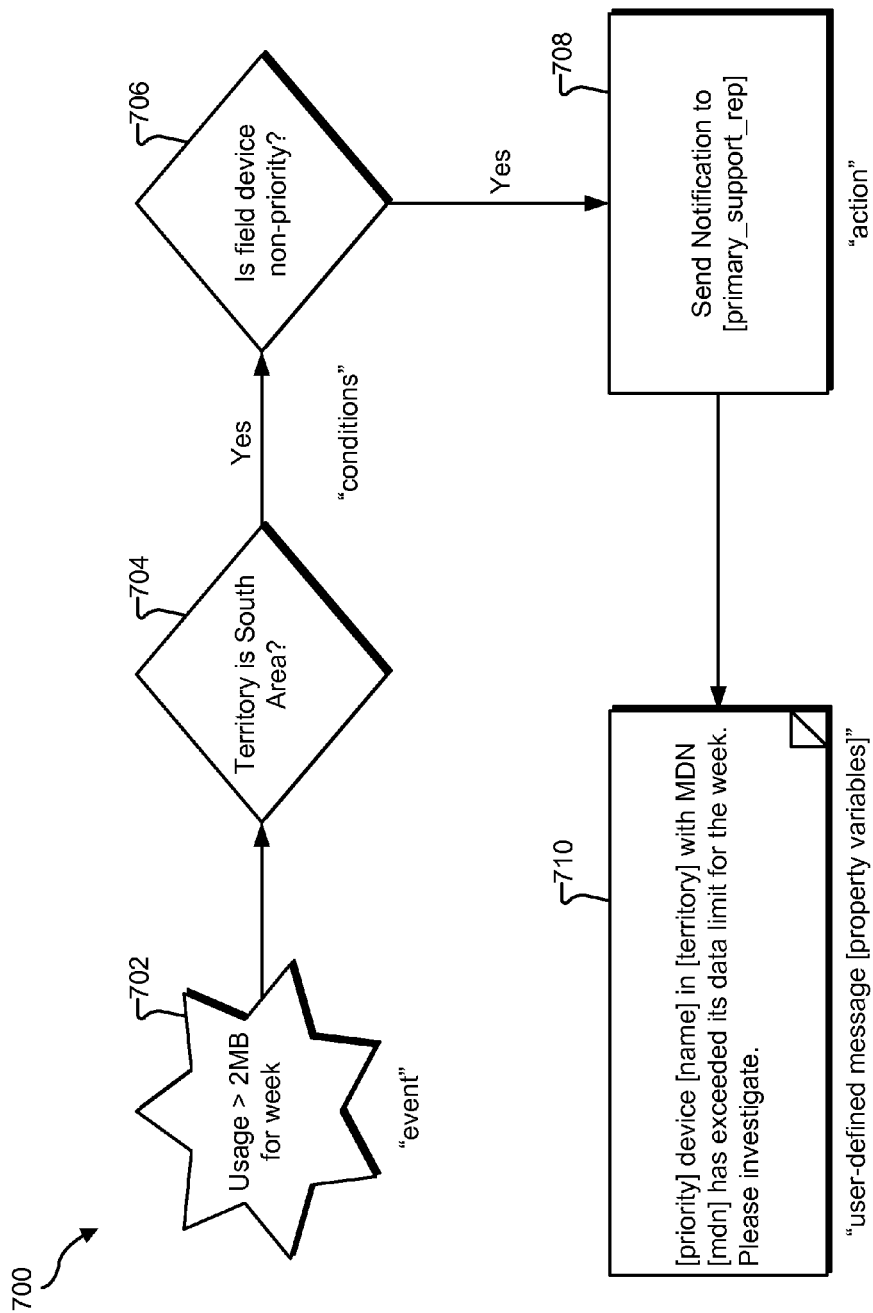
FIG. 7 shows an exemplary processing of an event that may be performed in accordance with a predefined rule according to principles disclosed herein.

To illustrate, FIG. 7 shows an exemplary processing 700 of an event that may be performed in accordance with a predefined rule. In the example of FIG. 7, the predefined rule may specify that if a non-priority field device in a territory named "South Area" exceeds two megabytes ("MB") of M2M data usage in a week, event processing facility 602 is to notify a support representative associated with the field device. Hence, as shown in FIG. 7, event processing facility 602 may determine that an event 702 has occurred (e.g., that data usage by a field device exceeds 2 MB in a week). In response, and in accordance with the predefined rule, event processing facility 602 may evaluate conditions 704 and 706 (e.g., whether the field device is located in the territory named "South Area" and whether the field device is a "non-priority" field device). If both conditions are met, event processing facility 602 may perform an action 708 specified by the predefined rule (e.g., send a notification to a support representative associated with the field device). As shown, the notification may be in the form of a message 710 (e.g., an email, a short messaging service ("SMS") message, or any other type of message) that may be transmitted to a computing device associated with the support representative. It will be recognized that the rule illustrated in FIG. 7 is merely illustrative of the many different rules that may be specified in accordance with the methods and systems described herein. Other exemplary rules will be described below.

In some examples, event processing facility 602 may determine that an event has occurred, evaluate one or more conditions associated with the event, and perform one or more actions based on the occurrence of a particular event if the one or more conditions are met in substantially real time as the event occurs. For example, with reference to the example provided in FIG. 7, conditions 704 and 706 may be evaluated and action 708 may be performed in substantially real time as event 702 occurs. In this manner, message 710 may be transmitted to the support representative immediately upon occurrence of event 702 so that the support representative may investigate the cause of the excess data usage.

As will be described in more detail below, rules governing the processing of events by event processing facility 602 may be created and/or modified by a user associated with the M2M platform. For example, a rule may be created and/or modified by a customer of the M2M solutions provider (e.g., by user 214), a system administrator (e.g., personnel associated with the M2M solutions provider), or any other authorized user as may serve a particular implementation.

Returning to FIG. 6, rules management facility 604 may be configured to perform one or more M2M rules management operations. For example, rules management facility 604 may manage (e.g., maintain, create, modify, or otherwise process) rules that may be applied to the substantially real-time processing of the events performed by event processing facility 602.

To illustrate, while event processing facility 602 processes events in substantially real time as the events occur, rules management facility 604 may receive data representative of a rule created by a user associated with the M2M platform and dynamically apply the rule to the substantially real-time processing of the events in response to receiving the data representative of the rule. In this manner, event processing facility 602 may immediately begin processing events that occur after the data representative of the rule is received in accordance with the rule.

Rules management facility 604 may receive data representative of a rule created by a user associated with the M2M platform in any suitable manner. For example, rules management facility 604 may provide a portal configured to facilitate creation of the rule by the user and to receive the data representative of the rule. Exemplary portals that may be used to facilitate user creation of a rule will be described below.

In some examples, the rule created by the user is a new rule not already being applied to the substantially real-time processing of the events at a time that the rule is created by the user. In some alternative examples, the rule created by the user is a modified version of a rule already being applied to the substantially real-time processing of the events at a time that the rule is created by the user.

Rules management facility 604 may dynamically apply a rule created by a user to the substantially real-time processing of events in any suitable manner. For example, rules management facility 604 may dynamically apply a rule created by a user to the substantially real-time processing of events by directing event processing facility 602 to process events that occur after the data representative of the rule is received in accordance with the rule. To illustrate, with respect to a particular event that occurs after the data representative of the rule is received, rules management facility 604 may direct event processing facility 602 to determine that one or more conditions associated with the particular event are met and perform one or more actions (e.g., in substantially real time) based on the occurrence of the event. As described above, the one or more conditions and the one or more actions may be specified by the rule.

In the case that the rule created by the user is a modified version of a rule already being applied to the substantially real-time processing of the events, rules management facility 604 may dynamically apply the modified version of the rule by dynamically replacing the rule already being applied to the substantially real-time processing of the events with the modified version of the rule. This may be performed in any suitable manner that provides a seamless transition (e.g., without interrupting the processing of the events) between processing events in accordance with the original rule and processing events in accordance with the modified version of the rule.

Storage facility 606 may be configured to maintain event data 608 representative of one or more detected events and rules data 610 representative of one or more rules managed by rules management facility 604. Storage facility 606 may maintain additional or alternative data as may serve a particular implementation.

Exemplary events associated with M2M objects that may occur and rules that may be applied to a processing of these events will now be described. It will be recognized that the events and rules described herein are merely illustrative of the many different events that may occur and rules that may be created in accordance with the methods and systems described herein.

In some examples, a user may request (e.g., attempt) to provision (e.g., activate, change a data usage plan, suspend, reconnect, restore, and/or change one or more features of) a customer asset configured to utilize an M2M platform (e.g., a customer computing device that includes an M2M client). A rule may be created (e.g., by the customer) that directs event processing facility 602 to detect the provisioning request (i.e., the event) and evaluate one or more conditions associated with the provisioning request (e.g., whether the provisioning request is of a certain type, whether the customer asset is included in a particular predetermined group and/or located within a particular territory, and/or whether the user is authorized to perform provisioning requests). The rule may further specify one or more actions that are to be performed depending on whether the one or more conditions are met. For example, the rule may direct event processing facility 602 to notify one or more users (e.g., an administrator, personnel associated with the customer, and/or any other user) of the provisioning request (e.g., by email, SMS, etc.), automatically authorize the provisioning request, automatically deny the provisioning request, and/or perform any other suitable action.

Continuing with the provisioning example, another rule may be created (e.g., by the customer) that directs event processing facility 602 to detect a successful provisioning transaction (i.e., a successful provisioning of a customer asset) and evaluate one or more conditions associated with the successful provisioning transaction. The rule may further direct event processing facility 602 to notify one or more users (e.g., an administrator, personnel associated with the customer, and/or any other user) of the successful provisioning transaction and/or perform any other suitable action as may serve a particular implementation.

Another rule may be created (e.g., by the customer) that directs event processing facility 602 to detect a provisioning transaction failure (i.e., a failed attempt to provision a customer asset) and evaluate one or more conditions associated with the provisioning transaction failure. The rule may further direct event processing facility 602 to notify one or more users (e.g., an administrator, personnel associated with the customer, and/or any other user) of the provisioning transaction failure and/or perform any other suitable action as may serve a particular implementation.

Another rule may be created (e.g., by the customer) that directs event processing facility 602 to notify one or more users (e.g., an administrator, personnel associated with the customer, and/or any other user) if a number of provisioning requests performed by a particular user goes over a predetermined threshold during a predetermined time period (e.g., a day, week, month, billing cycle, etc.). To this end, the rule may direct event processing facility 602 to evaluate one or more conditions each time the particular user performs a provisioning request (i.e., by incrementing a counter each time the user performs the provisioning request and determining whether the counter exceeds the predetermined threshold and by tracking when each provisioning request is performed in order to determine whether each provisioning request is performed during the predetermined time period) and notifying the one or more users when the number of provisioning requests performed by the particular user goes over the predetermined threshold during the predetermined time period.

In some examples, a rule may be created (e.g., by a customer) that directs event processing facility 602 to perform one or more actions if a customer asset uses more than a predetermined threshold amount of M2M data during a particular time period. For example, the rule may direct event processing facility 602 to notify a user (e.g., an administrator, personnel associated with the customer, and/or any other user) if a particular customer asset (or group of customer assets) uses more than 100 MB of M2M data during a billing cycle. In this manner, the user may take remedial action (e.g., disable the customer asset, upgrade the customer asset's data usage plan, etc.) in a timely manner. Additionally or alternatively, the rule may direct event processing facility 602 to automatically change (e.g., upgrade) the customer asset's data usage plan, disable the customer asset, and/or take any other action with respect to the customer asset if the customer asset uses more than a predetermined threshold amount of M2M data during a particular time period.

Additionally or alternatively, a rule may be created (e.g., by a customer) that directs event processing facility 602 to perform one or more actions if a customer asset uses less than a predetermined minimum threshold amount of M2M data during a particular time period. For example, the rule may direct event processing facility 602 to notify a user (e.g., an administrator, personnel associated with the customer, and/or any other user) if a particular customer asset (or group of customer assets) uses less than ten MB of M2M data during a billing cycle. In this manner, the user may ascertain whether the customer asset is operating correctly or being utilized as originally intended. Additionally or alternatively, the rule may direct event processing facility 602 to automatically change (e.g., downgrade) the customer asset's data usage plan, disable the customer asset, and/or take any other action with respect to the customer asset if the customer asset uses less than the predetermined minimum threshold amount of M2M data during the particular time period.

As mentioned, rules management facility 604 may provide a portal configured to facilitate creation by a user of a rule that is to be applied to a processing of events by event processing facility 602. The portal may be provided in any suitable manner (e.g., by way of an web browser, a web services interface such as a unified web services ("UWS") interface, and/or any other type of interface as may serve a particular implementation).

To illustrate, FIG. 8 shows an exemplary graphical user interface ("GUI") 800 that may be presented to a user by way of a portal provided by rules management facility 604. In particular, GUI 800 may facilitate creation of a rule that specifies that one or more users are to be notified in response to a provisioning of a customer asset. For example, GUI 800 may include an "account" field 802 that allows the user to select an account associated with a particular customer, a "rule name" field 804 into which the user may input a desired name of the new rule, a "notification group" field 806 that allows the user to select a particular group of users to whom the notification is to be sent, a "device ID" field 808 that allows the user to select a particular customer asset (or customer asset group) to be associated with the rule, an "event type" field 810 that allows the user to specify a particular event to be associated with the rule, a set of "conditions" fields 812 that allow the user to specify particular conditions to be associated with the rule, and various options 814 that allow the user to specify when the notification is to be performed.

As another example, FIG. 9 shows another exemplary GUI 900 that may be presented to a user by way of a portal provided by rules management facility 604. In particular, GUI 900 may facilitate creation of a rule that specifies that one or more users are to be notified in response to a particular customer asset using more than a predetermined threshold amount of M2M data in a specified time period. For example, GUI 900 may include an "account" field 902 that allows the user to select an account associated with a particular customer, a "rule name" field 904 into which the user may input a desired name of the new rule, a "notification group" field 906 that allows the user to select a particular group of users to whom the notification is to be sent, a "device ID" field 908 that allows the user to select a particular customer asset (or customer asset group) to be associated with the rule, an "event type" field 910 that allows the user to specify a particular event to be associated with the rule, and a set of "conditions" fields 912 that allow the user to specify particular conditions to be associated with the rule. As shown in FIG. 9, the user has specified that one or more users included in the notification group named "Customer Group 1") are to be notified when a device having a device ID of "Device_1234" uses more than 1000 kilobytes ("KB") of M2M data in a month.

As illustrated in FIG. 8 and FIG. 9, the GUIs presented to the user by way of the portal may have a consistent look and feel regardless of the particular rule being created or edited. In this manner, the user may more easily interact with rules management facility 604.

Figure 10:
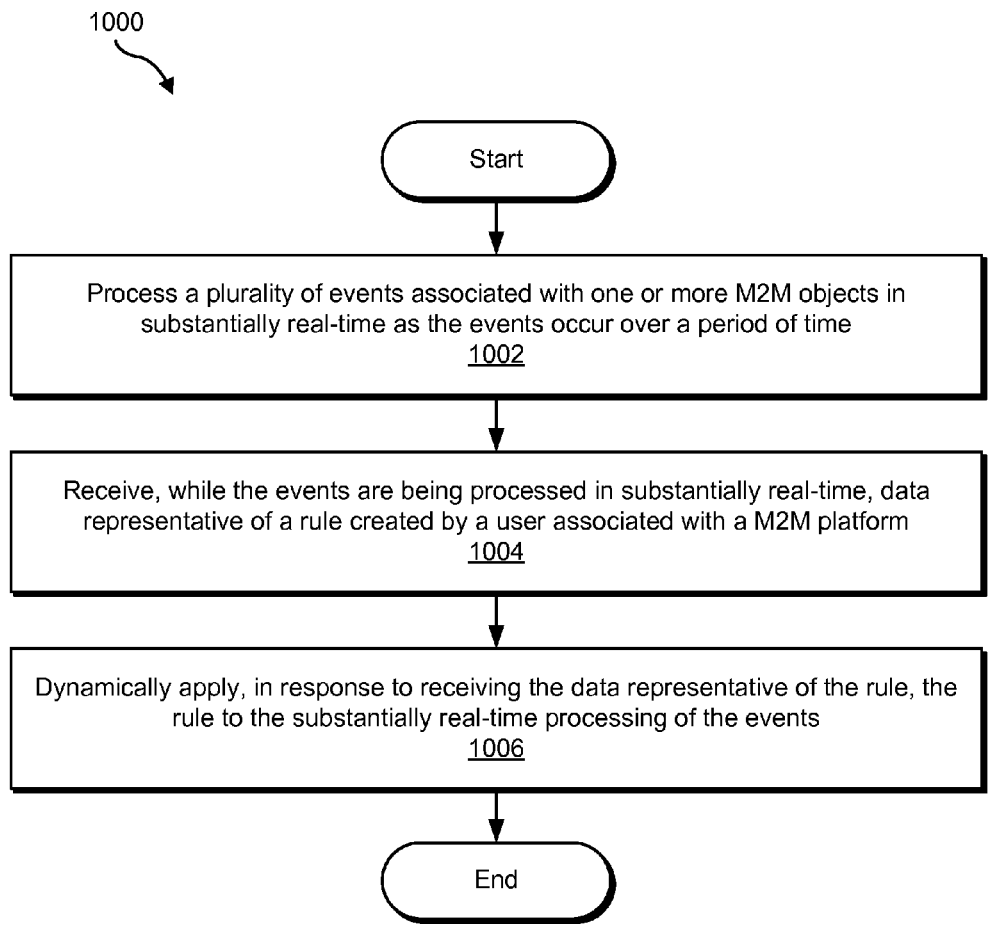
FIG. 10 illustrates an exemplary M2M rules management method according to principles disclosed herein.

FIG. 10 illustrates an exemplary M2M rules management method 1000. While FIG. 10 illustrates exemplary steps according to one embodiment, other embodiments may omit, add to, reorder, and/or modify any of the steps shown in FIG. 10. One or more of the steps shown in FIG. 10 may be performed by M2M rules management system 600 and/or any implementation thereof.

In step 1002, an M2M rules management system associated with an M2M platform processes a plurality of events associated with one or more M2M objects in substantially real-time as the events occur over a period of time. Step 1002 may be performed in any of the ways described herein.

In step 1004, the M2M rules management system receives, while the events are being processed in substantially real-time, data representative of a rule created by a user associated with the M2M platform. Step 1004 may be performed in any of the ways described herein.

In step 1006, the M2M rules management system dynamically applies, in response to receiving the data representative of the rule, the rule to the substantially real-time processing of the events. Step 1006 may be performed in any of the ways described herein.

Figure 11:
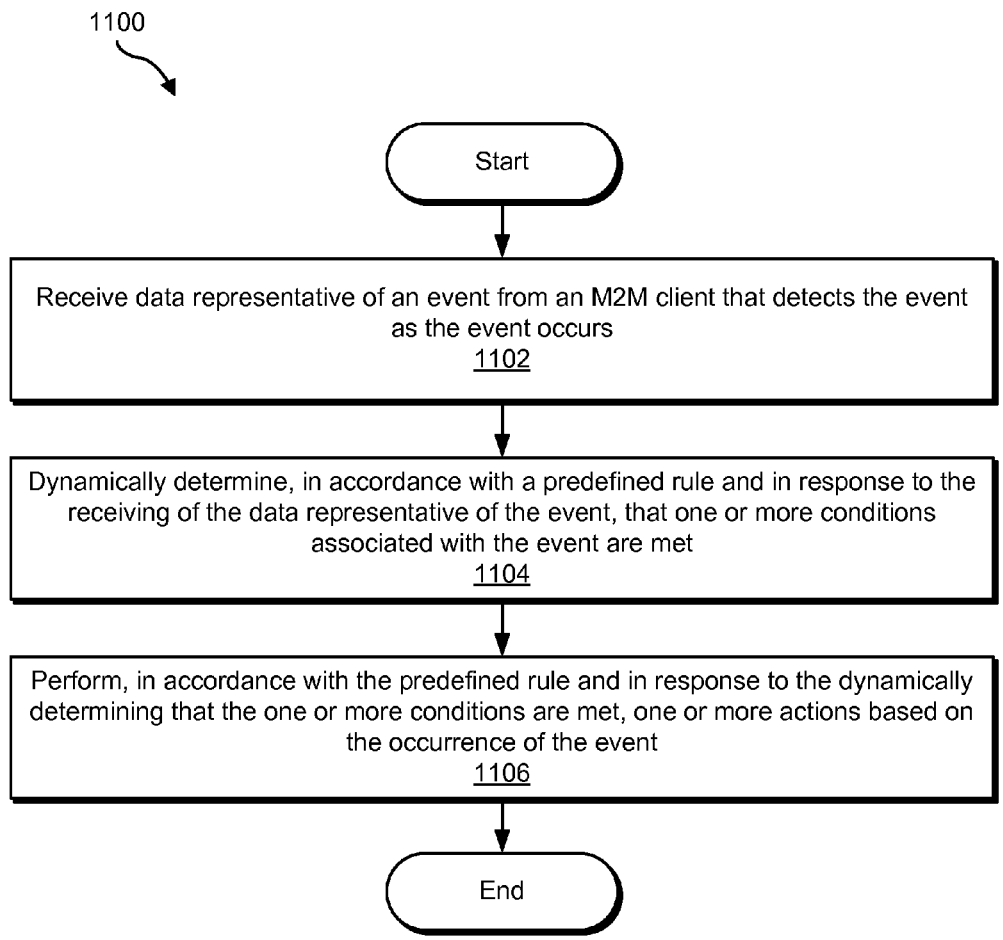
FIG. 11 illustrates another exemplary M2M rules management method according to principles disclosed herein.

FIG. 11 illustrates another exemplary M2M rules management method 1100. While FIG. 11 illustrates exemplary steps according to one embodiment, other embodiments may omit, add to, reorder, and/or modify any of the steps shown in FIG. 11. One or more of the steps shown in FIG. 11 may be performed by M2M rules management system 600 and/or any implementation thereof.

In step 1102, an M2M rules management system receives data representative of an event from an M2M client that detects the event as the event occurs. Step 1102 may be performed in any of the ways described herein.

In step 1104, the M2M rules management system dynamically determines, in accordance with a predefined rule and in response to the receiving of the data representative of the event, that one or more conditions associated with the event are met. Step 1104 may be performed in any of the ways described herein.

In step 1106, the M2M rules management system performs, in accordance with the predefined rule and in response to dynamically determining that the one or more conditions are met, one or more actions based on the occurrence of the event. Step 1106 may be performed in any of the ways described herein. In some examples, steps 1102, 1104, and 1106 are performed in substantially real-time as the event occurs.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 12:
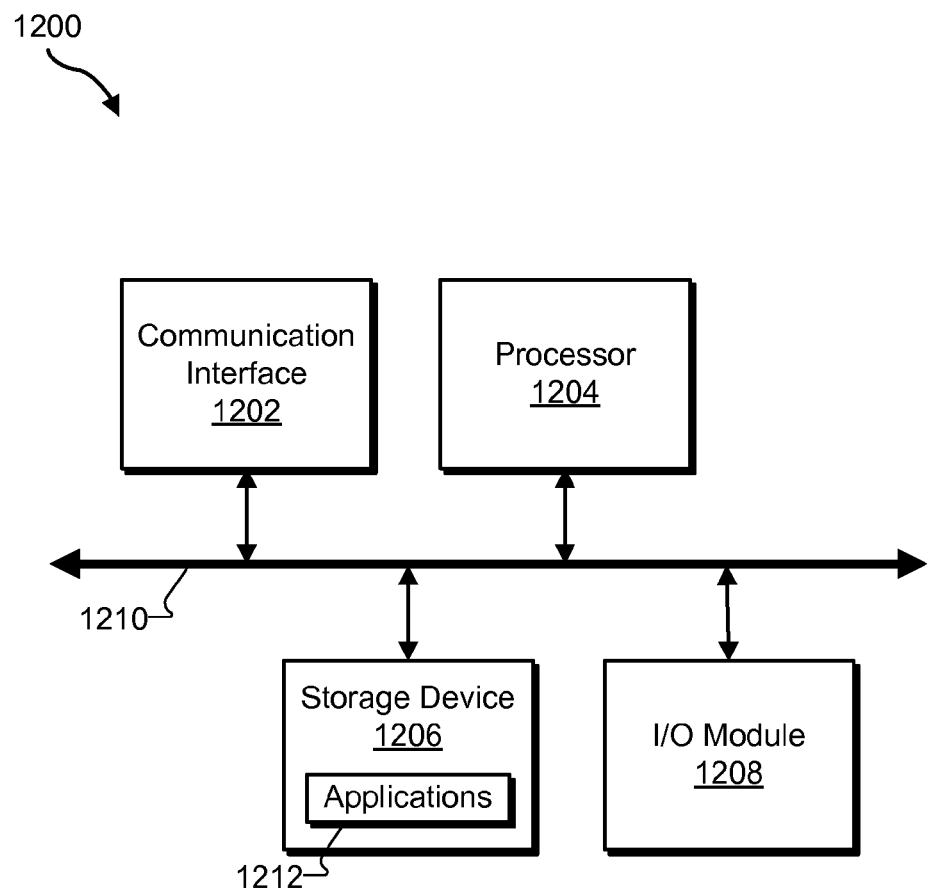
FIG. 12 illustrates an exemplary computing device according to principles disclosed herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the systems, subsystems, and/or facilities described herein may be implemented by or within one or more components of computing device 1200. For example, one or more applications 1212 residing within storage device 1206 may be configured to direct processor 1204 to perform one or more processes or functions associated with event processing facility 602 and/or rules management facility 604. Likewise, storage facility 606 may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    processing, by a machine-to-machine ("M2M") rules management system associated with an M2M platform, a plurality of events associated with one or more M2M objects in substantially real-time as the events occur over a period of time;
    receiving, by the M2M rules management system while the events are being processed in substantially real-time, data representative of a rule created by a user associated with the M2M platform; and
    dynamically applying, by the M2M rules management system in response to receiving the data representative of the rule, the rule to the substantially real-time processing of the events by processing one or more events that occur after the data representative of the rule is received in accordance with the rule, the processing of the one or more events in accordance with the rule comprising:
        determining, in accordance with the rule, that one or more conditions associated with the one or more events are met; and
        performing, in accordance with the rule and in response to the determining that the one or more conditions are met, one or more actions based on the occurrence of the one or more events,
    wherein
        the plurality of events comprises a plurality of requests to provision the one or more M2M objects, and
        the determining that the one or more conditions associated with the one or more events are met comprises one or more of determining that one or more requests to provision the one or more M2M objects are of a certain type, determining that the one or more M2M objects requested to be provisioned are included in a particular predetermined group of M2M objects, determining that the one or more M2M objects requested to be provisioned are located within a particular geographic territory, and determining that a user performing the plurality of requests to provision the one or more M2M objects is authorized to request the provisioning of the one or more M2M objects.

2. The method of claim 1, wherein the performing of the one or more actions comprises performing the one or more actions in substantially real time as the one or more events occur.

3. The method of claim 1, wherein the performing of the one or more actions comprises notifying at least one of the user and another user of the occurrence of the one or more events.

4. The method of claim 1, wherein the performing of the one or more actions comprises performing the one or more actions in substantially real time as the one or more events occur.

5. The method of claim 1, further comprising:
    providing, by the M2M rules management system, a portal for use by the user and configured to facilitate creation of the rule;
    wherein the receiving of the data representative of the rule created by the user comprises receiving the data by way of the portal.

6. The method of claim 1, wherein the rule created by the user is a new rule not already being applied to the substantially real-time processing of the events at a time that the rule is created by the user.

7. The method of claim 1, wherein the rule created by the user is a modified version of a rule already being applied to the substantially real-time processing of the events at a time that the rule is created by the user.

8. The method of claim 7, wherein the dynamically applying of the rule to the substantially real-time processing of the events comprises dynamically replacing the rule already being applied to the substantially real-time processing of the events with the modified version of the rule.

9. The method of claim 1, wherein the one or more M2M objects comprise at least one of a device utilizing the M2M platform and an entity utilizing the M2M platform.

10. The method of claim 1, further comprising receiving, by the M2M rules management system, data representative of the events from one or more M2M clients that detect the events as the events occur, the one or more M2M clients configured to operate in accordance with the M2M platform.

11. The method of claim 1, embodied as computer-executable instructions on at least one non-transitory computer-readable medium.

12. A method comprising:
    receiving, by a machine-to-machine ("M2M") rules management system, data representative of an event from an M2M client that detects the event as the event occurs;
    dynamically determining, by the M2M rules management system in accordance with a predefined rule and in response to the receiving of the data representative of the event, that one or more conditions associated with the event are met; and
    performing, by the M2M rules management system in accordance with the predefined rule and in response to the dynamically determining that the one or more conditions are met, one or more actions based on the occurrence of the event;
    wherein
        the event comprises a request to provision a customer asset associated with the M2M client,
        the dynamically determining that the one or more conditions associated with the event are met comprises one or more of determining that the request to provision the customer assert is of a certain type, determining that the customer asset requested to be provisioned is included in a particular predetermined group of customer assets, determining that the customer asset requested to be provisioned is located within a particular geographic territory, and determining that a user performing the request to provision the customer asset is authorized to request the provisioning of the customer asset, and the receiving, dynamically determining, and performing are performed in substantially real-time as the event occurs.

13. The method of claim 12, wherein the performing of the one or more actions comprises notifying another user of the occurrence of the event.

14. The method of claim 12, further comprising:
providing, by the M2M rules management system, a portal for use by another user and configured to facilitate creation of the predefined rule; and
receiving, by the M2M rules management system, data representative of the predefined rule from the another user by way of the portal.

15. The method of claim 12, embodied as computer-executable instructions on at least one non-transitory computer-readable medium.

16. A system comprising:
an event processing facility that processes a plurality of events associated with one or more machine-to-machine ("M2M") objects associated with an M2M platform in substantially real-time as the events occur over a period of time, the plurality of events comprising a plurality of requests to provision the one or more M2M objects; and
a rules management facility communicatively coupled to the event processing facility and that
receives, while the events are being processed in substantially real-time, data representative of a rule created by a user associated with the M2M platform, and
dynamically applies, in response to receiving the data representative of the rule, the rule to the substantially real-time processing of the events by:
determining that a particular event has occurred;
dynamically determining, in accordance with a predefined rule and in response to the determining that the particular event has occurred, that one or more conditions associated with the particular event are met; and
performing, in accordance with the predefined rule and in response to the dynamically determining that the one or more conditions are met, one or more actions based on the occurrence of the particular event,
wherein the dynamically determining that the one or more conditions associated with the particular event are met comprises one or more of determining that a request to provision an M2M object is of a certain type, determining that the M2M object requested to be provisioned is included in a particular predetermined group of M2M objects, determining that the M2M object requested to be provisioned is located within a particular geographic territory, and determining that a user performing the request to provision the M2M object is authorized to request the provisioning of the M2M object.

17. The method of claim 1, wherein the performing of the one or more actions comprises automatically authorizing a request to provision an M2M object included in the plurality of M2M objects or automatically denying the request to provision the M2M object included in the plurality of M2M objects.

18. The method of claim 12, wherein the request to provision the customer asset associated with the M2M client comprises a request to activate, deactivate, or change one or more features of the customer asset.

* * * * *